UNITED STATES PATENT OFFICE.

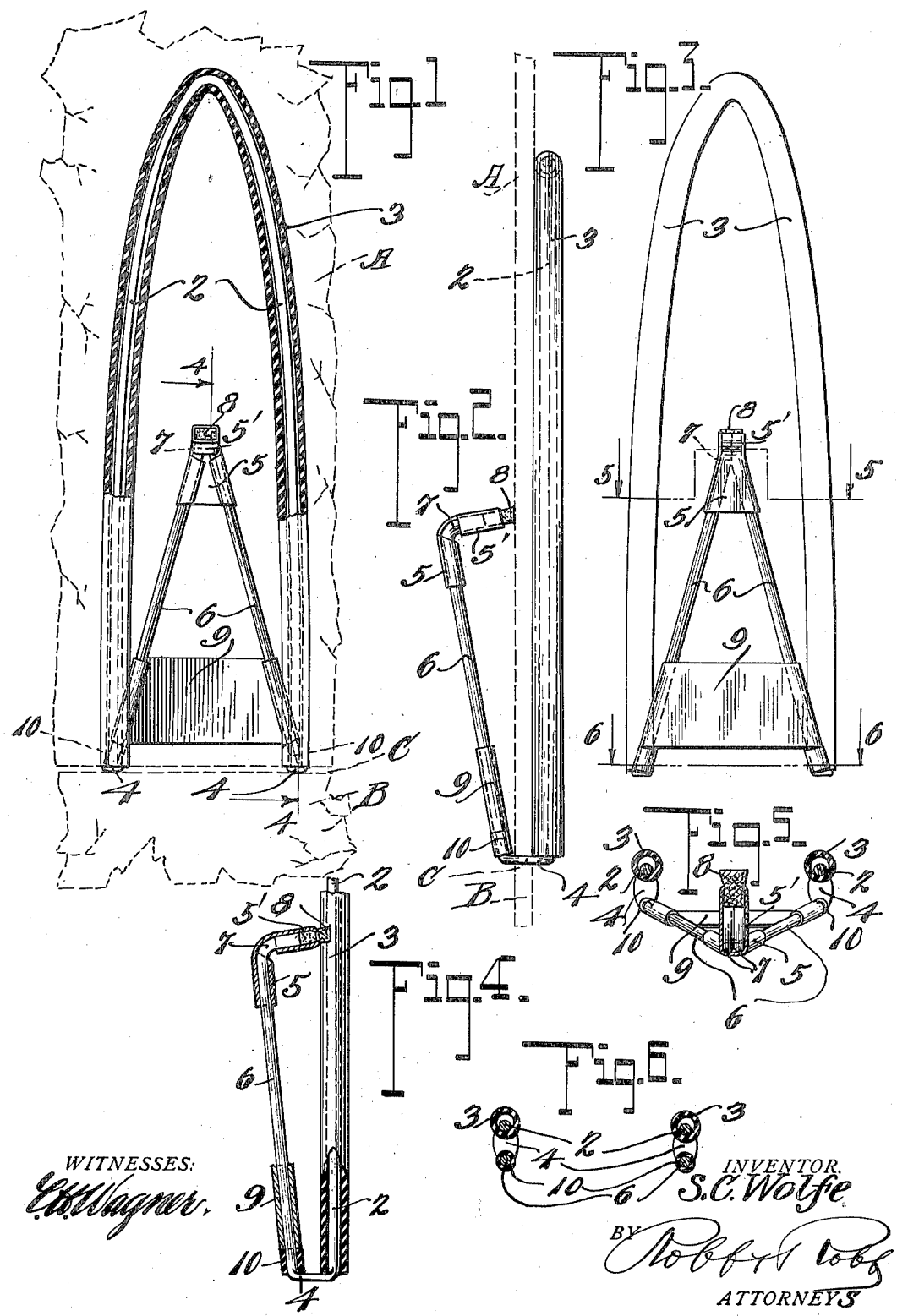

SAMUEL C. WOLFE, OF ANGOLA, INDIANA.

WIND-SHIELD CLEANER.

1,290,464.   Specification of Letters Patent.   Patented Jan. 7, 1919.

Application filed December 4, 1917. Serial No. 205,371.

*To all whom it may concern:*

Be it known that I, SAMUEL C. WOLFE, a citizen of the United States, residing at Angola, in the county of Steuben and State of Indiana, have invented certain new and useful Improvements in Wind-Shield Cleaners, of which the following is a specification.

The present invention relates to improvements in that type of cleaning devices for windshields of automobiles and similar surfaces, disclosed in my co-pending application Serial Number 173,146 filed June 6th, 1917, the object of these improvements being to provide a more simple and economical structure from the manufacturing standpoint but yet one possessing all the advantages of my previous embodiments.

To this end I employ, as in my previous Patent No. 1,171,377 granted February 8th, 1916, a single piece of wire which by a novel manner of bending produces the wiping element operable upon the exterior surface of the windshield and secures thereon a covering, the ends of the wire being so brought together and bent as to provide a manipulating handle coacting with the surface of the shield opposite that on which the wiper element is operable.

The objects and advantages of my invention will become apparent by reference to the following specification and claims, in connection with the illustrations of the annexed drawings, in which:—

Figure 1 is an elevation showing the application of the device to the windshield, a portion of the covering for the wiping element being broken away and shown in section;

Fig. 2 is a side elevation of the device;

Fig. 3 is an elevation of the invention taken from the opposite side from that disclosed in Fig. 1;

Fig. 4 is a fragmentary sectional view taken about on the plane indicated by the line 4—4 of Fig. 1, and Figs. 5 and 6 are sectional views on the line 5—5 and 6—6, respectively, of Fig. 3.

Referring to the drawings, A indicates the upper section of a windshield, B the lower section, and C the dividing line between the two. The device which forms the subject matter of this application is applied to the windshield so as to span the upper section A and is so formed as to move between the two sections as indicated in Figs. 1 and 2 of the drawings. The device is simply constructed from a single piece of light wire which is bent intermediate its length so as to form spaced wiper elements 2 upon which is loosely mounted a rubber tube 3 of sufficient length to fully cover the wiper members 2. Incidental to the bending of the wire as just described the tubing is held in place upon the wiper elements so that it is not necessary to employ any adhesive to seal the tubing to the wire. In addition to this fact it permits of the use of a tubing which is slightly larger than the wire so that said tubing is relatively movable with respect to the wire. It therefore becomes an easy matter to twist the tubing at the bent portion 1 when it is desired to bring a fresh surface of the tubing into proper position for contacting with the surface of the windshield as may be desired owing to wear of that portion which previously performed the wiping function. Furthermore, the looseness of the tubing gives rise to a softer contact of the wiper member with the shield; less pressure is required to obtain the desired cleaning of the surface.

Reverting now to the further structural features of the wiper member, it will be observed from Figs. 2 and 4 that the end portions of the wire are bent laterally as at 4 to form the throat or bridge portion which engages about the edge of the windshield. At this bridging portion the wire is flattened so as to enable the throat portion to operate in the narrow space between the two shield sections. The ends of the wire from this point are bent upwardly and converge so as to be brought into intimate contact, in which position the extremities are held by the clip 5. The upward bent portion indicated on the drawings at 6 constitutes a handle by means of which the device is operated to and fro upon the windshield. The very extreme ends of the wire, furthermore, are bent inwardly from the handle as indicated at 7 and about this portion an extension 5' of the clip engages, such extension being utilized, furthermore, in addition to receive the non-abrasive contact substance 8 which rests upon the inner surface of the windshield and produces a pressure point by means of which the wiper members on the outer surface of the shield are held in close contact. It will be observed, furthermore, that the tip ends of the wire against which the contact member 8 is disposed prevents such contact member from being displaced inwardly due to the pressure which is constant thereon when the device is applied to a windshield. Adjacent to the throat 4 and on the handle, preferably, I provide a spacing member or plate 9 which holds the sides of the wire at the bridge part in spaced relation. The spacing of the two bridging portions is useful in that the device will best retain its true vertical position during manipulation of the cleaner upon the shield.

In order to prevent the wire adjacent to the throat from directly engaging with the sharp edge of the windshield glass, I preferably mount a short piece of rubber upon each wire element as indicated at 10, these pieces being held in position adjacent to the flattened portion by the spacing plate 9 hereinbefore described.

It will be apparent from the foregoing description that the device may be very cheaply manufactured as hereinbefore premised, and, owing to the readiness with which the wiper elements conform to the surface over which they are moved, incident to the use of tubing larger than the wire, no special tension or pressure need be applied to the device in moving it to and fro. As a matter of fact, pressure of the finger laterally on the handle will be sufficient to cause its movement yet the required pressure will be applied to clear the outer surface of moisture, rain or snow. Again, the device may be made much smaller than that of my earlier patent hereinbefore referred to and thus a less conspicuous accessory for the vehicle.

Having thus described my invention, what I claim as new is:

1. A windshield cleaner of the class described comprising a piece of wire bent intermediate its length to form a wiper for operating upon the surface of the shield, a covering loosely mounted on said wire and extending about the bent portion for performing the cleaning function and secured against accidental rotative movement by the bent formation aforesaid, and manipulative means for moving the wiper over the surface of the shield.

2. A windshield cleaner of the class described comprising a piece of wire bent intermediate its length to form a wiper of substantially U-shape for operating upon the surface of the shield, a tubular covering of larger diameter than said wire loosely mounted thereon and about the bent portion, said covering being held against accidental rotative and longitudinal movements by the bent formation aforesaid, and affording a soft yieldable contact on the surface of the shield so as to readily conform to said surface, said covering being freely shiftable by twisting of the same at the bent portion whereby to change its contacting surface when desired, and manipulative means for moving the wiper member over the surface of the shield.

3. A windshield cleaner of the class described comprising a single piece of wire bent intermediate its length to provide wiper elements extending in spaced relation from the bent portion, a covering mounted upon the wiper elements aforesaid, the ends of the wire being rebent toward the wiper elements to lie substantially parallel thereto but spaced therefrom to form a handle, means for holding the wiper elements at the rebent portion in spaced relation, and means for connecting the wire ends together.

4. A windshield cleaner of the class described comprising a single piece of wire bent intermediate its length to provide spaced wiper elements, a covering mounted on the wiper elements, the ends of the wire being bent over toward the wiper elements and brought together to form a handle, and clip means for connecting the ends together and having a pressure contact part for bearing against the surface of the shield to thereby hold the wiper elements against the shield surface.

5. A windshield cleaner of the class described comprising a single piece of wire bent intermediate its length to form a wiper, a handle for operating the same, and a tubular covering mounted on the wire, said wire being of substantially smaller diameter than the covering loosely fitting thereon and affording a yieldable soft contact of the wiper readily conformable to the surface on which it is operated.

6. A windshield cleaner of the class described comprising a single piece of round wire bent intermediate its length to form a wiper and having wiping means thereon, the end portions of the wire being rebent toward the wiper to provide a handle, said handle having a contact extremity for producing pressure to hold the wiper against the shield, the wire at the rebent portion being flattened at the point of spanning the edge of the wind shield.

7. A windshield cleaner of the class described comprising a wiper member, a covering mounted upon the member and having a continuous wiping contact surface, said covering being loosely arranged thereon so as to be freely shiftable to change the particular contacting point from time to time, said covering being readily conformable to the surface of the shield during wiping operation, and said wiper member being adapted to firmly bear against and press the covering against the shield substantially throughout the length of the covering, and manipulative means for moving the wiper over the surface of the shield.

In testimony whereof I affix my signature.

SAMUEL C. WOLFE.